July 31, 1923.

A. STANLEY

TANK FILLER AND CONTENTS INDICATOR

Filed July 25, 1921

1,463,342

INVENTOR:
Albert Stanley,
BY
E. T. Silvius,
ATTORNEY.

Patented July 31, 1923.

1,463,342

UNITED STATES PATENT OFFICE.

ALBERT STANLEY, OF INDIANAPOLIS, INDIANA.

TANK FILLER AND CONTENTS INDICATOR.

Application filed July 25, 1921. Serial No. 487,532.

*To all whom it may concern:*

Be it known that I, ALBERT STANLEY, a citizen of the United States, residing at Indianapolis, in the county of Marion and State of Indiana, have invented new and useful Tank Fillers and Contents Indicators, of which the following is a specification, reference being had to the accompanying drawings, and to the figures of reference marked thereon.

This invention is a continuation or improvement of that described in my application for Letters Patent for a tank filler and contents indicator, Serial No. 333,354, filed October 25, 1919, Patent No. 1,379,226, dated May 24, 1921, in so far as the subject matter is common to both applications.

An object of the invention is to provide an improved tank filler, discharger and contents indicator combined into a single unit whose structure shall readily adapt it for connection or replacement on a tank or reservoir, and constructed so as to permit the quantity of the contents to be readily ascertained.

Another object is to provide an automobile fuel tank adapted to be arranged at the rear of an automobile frame and which shall be provided with a filler, discharger and contents indicator so constructed and arranged as to be readily accessible and visible at all times, from a standing position at a convenient distance therefrom.

Still another object is to provide an improved tank filler, discharger and contents indicator of simple and reliable construction and durable and economical in use, for attaching to a tank commonly known as an underslung tank whereby the discharge can be drawn from the top of the tank by the well known vacuum system carburetor feed.

With the above-mentioned and other objects in view, the invention consists in a filling neck structure of novel construction having contents-indicating mechanism accurately and readily observable when required, and a discharge connection combined therewith; and the invention consists also further in the novel and simplified construction, and parts, combinations and arrangements of parts, as hereinafter more particularly described and set forth in the accompanying claims.

Figure 1:
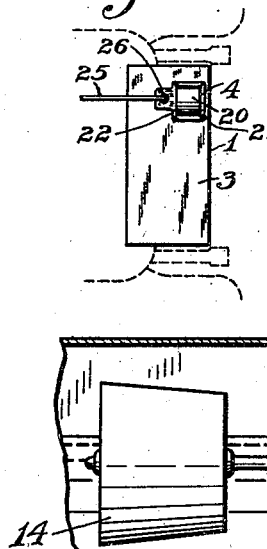
Figure 2:
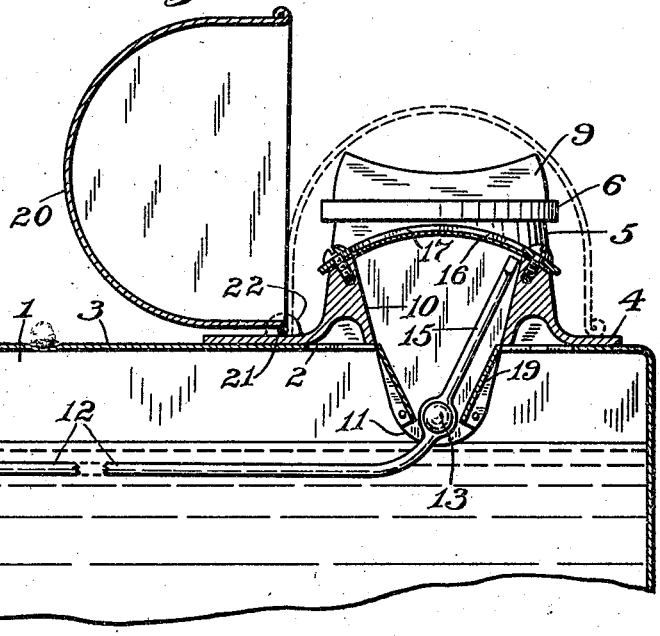
Figure 3:
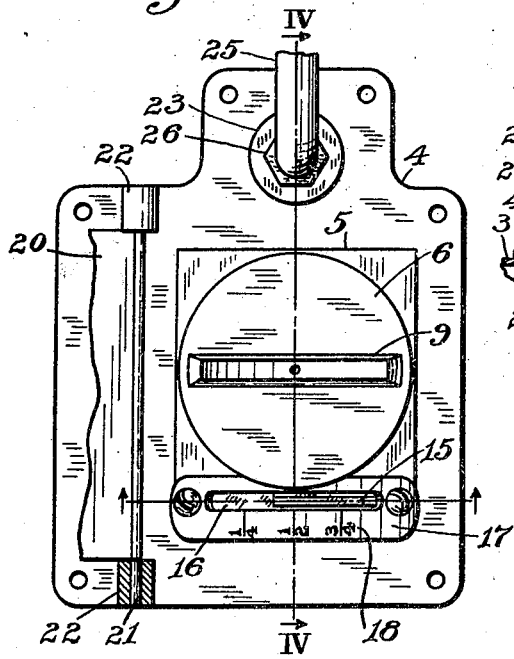
Figure 4:
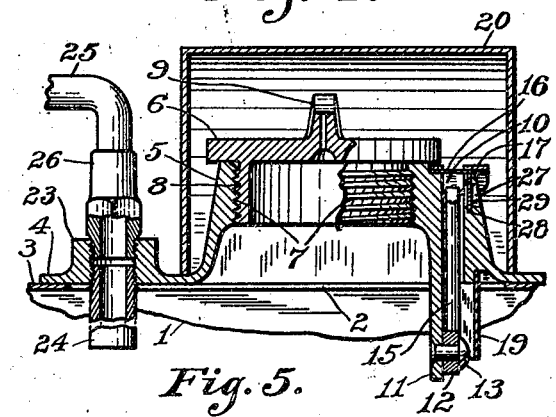
Figure 5:
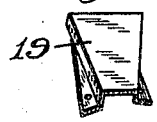

Referring to the drawings;—Figure 1 is a top plan of an automobile tank or reservoir provided with the improved filler, discharger and contents indicator; Fig. 2 is an enlarged side sectional elevation showing the indicating mechanism applied to a tank; Fig. 3 is a top plan of the improved filler, discharger and contents indicator; Fig. 4 is a transverse sectional elevation on the line IV—IV in Fig. 3; and, Fig. 5 is a perspective view of a splash guard for the contents indicator.

Similar reference characters in the different figures of the drawings indicate like parts or features of construction herein referred to in detail.

An automobile gasoline or fuel tank 1 is provided with an opening or orifice 2 in the upper horizontal side or top 3 for admittance to the interior of the tank, or in case of replacement the opening provided would be enlarged to the required size. Upon the side or top 3 and covering the opening or orifice 2 a base or body 4 is riveted and attached so as to hermetically seal the tank 1.

The base or body 4 has a threaded neck 5 for the ingress of the liquid fuel, and is provided with a cap 6 provided with threads 7 to engage the threads 8 provided in the neck 5, the cap having a ridge or wall 9 to provide a key. The wall of the neck 5 has a thick portion in which is a slot or recess 10, one side wall of which projects downward and forms a hanger or support 11 to which a rod or beam 12 is pivotally supported by a pivot 13. At one end of the rod or beam 12 a buoy or float 14 is secured and the shorter end beyond the pivot 13 is pointed to provide a pointer or indicator 15. To cover the slot or recess 10 a transparent curved plate 16 is secured by a frame plate 17 to the thick wall portion upon which contents indicating marks 18 are displayed, the drawing merely illustrating one of various methods that may be employed. On one side of the hanger 11 and enclosing the indicator pointer 15 a splash guard 19 is secured to prevent the splashing of the liquid fuel about the indicator 15 and transparent plate 16, thus preventing the clouding of their visibility.

A cover 20 is hingedly mounted upon a rod 21 supported in ears or bosses 22 projecting from the base or body 4. While the automobile is in operation the cover should be closed, as shown by dotted lines in Fig. 2, thus preventing the collection of dust and dirt drawn by the suction of the moving car, as well as at all times when not required to be open, and the settling of dust whereby the visibility of the indicator is impaired. For filling the tank or when desiring to observe the contents it is an easy matter to lift the cover 20. A boss 23 is provided on the base or body 4 and threaded to receive a suction pipe 24 and a discharge pipe 25 attached preferably by the connection 26, thus requiring only a single orifice in the tank top for the accommodation of the filling, discharging and contents indications as described above.

In some cases an auxiliary means to facilitate the reading of the contents indicator is provided by forming an arcial slot 27 in the neck wall at the outer side of the slot or recess 10 and opposite to the hanger 11, having grooves 28 into which a transparent sheet 29 is fitted, thus admitting of a reading to be taken from the rear of the tank 1.

In practical use the cover 20 is raised, admitting of access to the filler cap 6 which can be removed by rotating in a counter clock-wise direction, or the contents can be noted through the action of the indicator 15 which operates in direct ratio to the float 14 riding upon the surface of the liquid fuel. The discharge action through the pipe 25 is accomplished by a suction from the explosion engine through the medium of a vacuum tank system.

Having thus described the invention, what is claimed as new is:—

1. A tank filler and contents indicator including a base plate having an inlet neck, the wall of the inlet neck having a thick portion provided with a vertical slot and a downwardly-extending hanger at one side of the plane of the slot, a closure for the inlet neck, a pointer pivotally connected to the hanger and extending into the slot, a controlling rod fixed to the pointer, a buoyant device fixed on the controlling rod, and a cover hinged to the base plate adjacent to the inlet neck to cover the neck and the vertical slot.

2. A tank filler and contents indicator including a base plate having an inlet neck and an outlet device separate from the neck, the wall of the inlet neck having a thick portion provided with a vertical slot and a downwardly-extending hanger at one side of the plane of the slot, a closure for the inlet neck, a pointer pivotally connected to the hanger and extending into the slot, a controlling rod fixed to the pointer, a buoyant device fixed on the controlling rod, a cover hinged to the base plate adjacent to the inlet neck to cover the neck and the vertical slot, and a splash guard below the slot and secured to the hanger.

3. A tank filler and contents indicator including a base having an inlet neck, the wall of the neck having a thick portion provided with a vertical slot and also a hanger extending downward beyond the base, the hanger having a splash guard on one side thereof and connected with said thick wall portion, a removable closure for the inlet neck, a transparent plate and a graduated and slotted indicator plate secured to the top of said thick wall portion, the transparent plate covering said slot, a pointer pivotally supported between the lower portions of the hanger and said guard and extending upward into said slot, a controlling rod fixed to the pointer, and a buoyant device fixed to the controlling rod.

4. A tank filler and contents indicator including a base plate having an inlet neck and an outlet device separate from the neck, the wall of the inlet neck having a thick portion provided with a vertical slot and a downwardly-extending hanger having a splash guard on one side thereof connected with said thick wall portion, a removable closure for the inlet neck, a pointer pivotally supported between the lower portions of the hanger and said guard and extending into said slot, a controlling rod fixed to the pointer, a buoyant device fixed to the controlling rod, and a cover hinged to the base plate to rest upon the plate and inclose the inlet neck and cover said slot, one portion of the cover in normal position extending between the neck and the outlet device.

5. A tank filler and contents indicator including an inlet neck, the wall of the neck having a thick portion provided with a vertical slot and a sight opening in the vertical wall and also a downwardly extending hanger at one side of and within the neck, a removable closure for said neck, an indicator plate secured upon the thick wall portion and covering the slot, a pointer pivotally connected to the hanger and extending towards the indicator plate, a controlling rod fixed to the pointer beyond the pivot, a buoyant device fixed on the controlling rod, an auxiliary indicator plate secured to the vertical wall and covering the sight opening therein, a splash guard below the slot and secured to the hanger, and a hinged cover to encompass the otherwise exposed parts described above.

6. A tank filler and contents indicator comprising a base having a tubular neck, a closure for said neck, an upwardly-facing indicator base on one side of and adjacent to said neck having an indicator slot therein, with a transparent plate and a graduated and slotted indicator plate secured to the upwardly facing portion of said base and covering the said slot, the indicator base having an auxiliary arcial sight opening extending from said indicator slot through the outer wall of said base, the wall being provided with a groove for retaining a vertical transparent plate, a transparent plate seated in the groove, a hanger on the under side of the base adjacent to said neck and extending downwardly from said slot, an indicator pointer pivoted to said hanger and extending upwardly towards and nearly to said transparent plates, a controlling rod extending angularly from the pivoted portion of said pointer, a float fixed on said rod, and a cover hinged to said base on one side of said neck and covering the neck and the indicator base.

In testimony whereof, I affix my signature in presence of two witnesses.

ALBERT STANLEY.

Witnesses:
E. T. SILVIUS,
ROBERT LIEBRICH.